May 18, 1926.
G. C. MONCKMEIER
WEAR COMPENSATING BOLT
Filed May 14, 1924
1,585,309
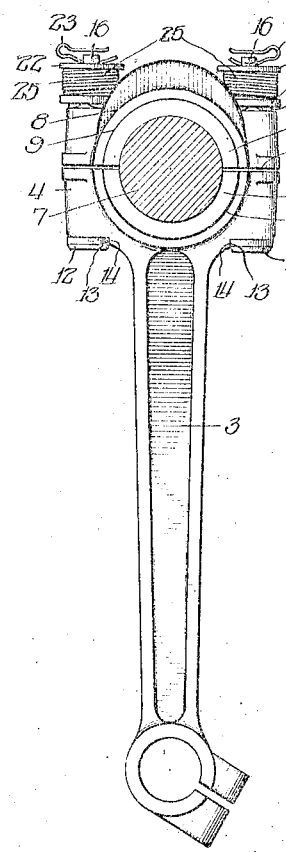
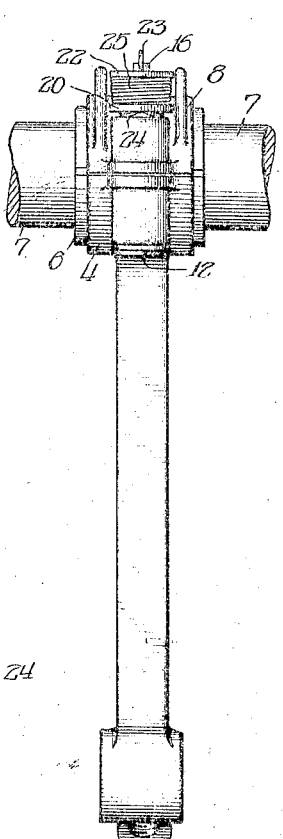
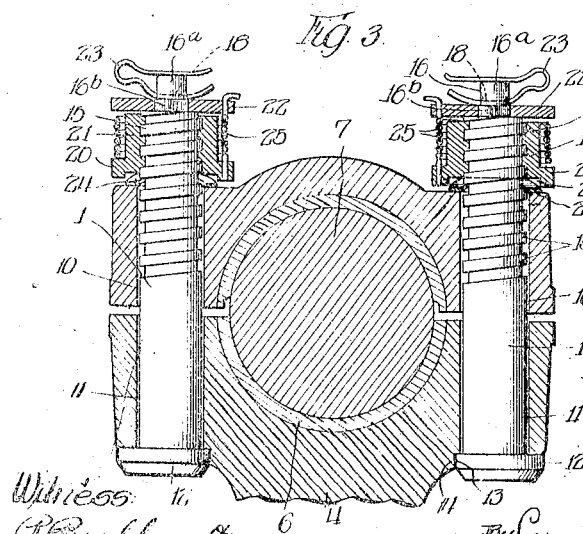
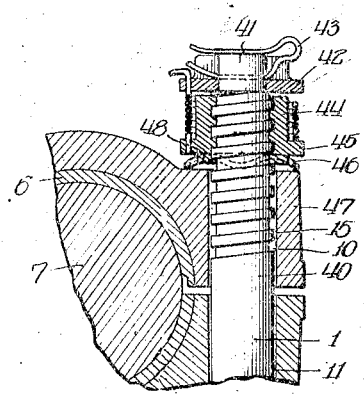
Inventor:
Gustav C. Monckmeier Patented May 18, 1926.

1,585,309

UNITED STATES PATENT OFFICE.

GUSTAV C. MONCKMEIER, OF TIPTON, IOWA.

WEAR COMPENSATING BOLT.

Application filed May 14, 1924. Serial No. 712,151.

This invention relates generally to self-tightening bolts, and specifically to that type of self-tightening or wear-compensating bolts having means for automatically advancing a wear-compensating member on the bolt threads to retain a snug cooperation between the parts connected by means of the bolt.

The general purpose of the invention is to provide a wear-compensating bolt peculiarly adapted to compensate for irregular wear of the parts with which it is associated. In pursuance of this general purpose, the prime object of the invention is to provide an automatic self-tightening bolt particularly applicable for use on the connecting rod bearings of a crankshaft, which will compensate for wear of the bearings, but will yield to varying pressures caused by the unevenness of wear on the shaft to the extent necessary to prevent undue stiffness of the motor and to avoid excessive friction.

Another object of the invention is to provide means for conveniently assembling the individual units of the device and which in a simple and efficient manner will enable application of the desired degree of tension to the nut-tightening spring.

Certain incidental advantages, such as reduction of motor knocking and loss of power, are directly traceable to the invention.

Other advantages will be apparent upon perusal of the specification, examination of the drawings and a full understanding of the invention.

In the drawings which form a part of the specification I have shown a preferred embodiment and modified form of the invention as applied to the crankshaft of an internal combustion engine, but it is to be understood that this showing is for purposes of illustration only, and not to be construed as limiting the scope of the protection to which the invention is entitled, as defined by the appended claims; for, obviously, various modifications in construction, changes in proportion, form and minor details are permissible and are contemplated as within the purview of the invention.

In the drawings,

Fig. 1 is a front elevation, illustrating an application of the invention to the connecting rod bearing of an engine;

Fig. 2 is a side elevation of the same;

Fig. 3 is an enlarged sectional view through the bearing on the line 4—4 of Fig. 2;

Fig. 4 is a fragmentary view corresponding to Fig. 3, showing a modified form of the invention;

Fig. 5 is a perspective view of the resilient member which permits a slight retraction of the closure member to accommodate any excessive pressure.

Referring to Figs. 1 to 3 of the drawings, the numeral 1 designates a pair of bolts securing the bearing assembly 2 of a connecting rod 3. The members comprising this assembly are an annularly recessed jaw 4 formed on the upper end of the connecting rod 3 and adapted to receive and support in the mouth 5 thereof a split bearing bushing 6 which forms a bearing on the shaft 7. At either side of the mouth, the jaw 4 is longitudinally bored to receive the bolts 1, which lock the bushing 6 between the jaw and complementary closure cap 8. The cap is similarly recessed and bored and in operative position its mouth 9 cooperates with the mouth 5 to retain the bushing 6, and its bores 10 align with those of the jaw to form slots 11 which house the bolts 1.

Each bolt 1 has a head 12, notched in its periphery as at 13 to engage a shoulder 14 formed on the under side of the jaw 4 adjacent the slot 11, thus preventing the bolt from turning in the slot. Each bolt is further provided with a screw-threaded portion 15 of comparatively long pitch, and on the shank end with an extension 16 of reduced diameter. The outer portion 16ᵃ of this extension is round in cross-section while the inner portion 16ᵇ is square, also of slightly greater cross-sectional area and is transversely bored at 18 to receive a locking member.

A nut 19, having a circumferential flange or head 20 and a relatively long round neck 21, cooperates with the bolt 1 to lock the jaw and closure cap. As will be observed, the bolt is inserted at the bottom of the slot and its threaded shank projects beyond the top of the closure cap. The nut 19 is applied head first and screwed down until the jaw and complementary cap are tight. These do not come together, a slight opening being left which is gradually reduced as the parts wear. A washer 22 fits over the squared extension 16ᵇ and is held against displacement by a cotter key 23, which is inserted through the extension at 18 between the washer and the end of the bolt. Encompassing the neck 21 of the nut 19 is a coil spring 25, one end of which is anchored to the flanged head 20, the other end being fastened to the washer 22. In use, the spring 25 is placed under torsional stress, thus tending to advance the nut 19 on the bolt threads 15. To obtain the proper degree of stress in a convenient manner the washer is turned clockwise about the round portion 16ª of the extension, and then seated upon the square portion where it is locked by the cotter key.

It will be understood that as the bearing parts wear they will be correspondingly drawn together through advancement of the nut upon the threads of the bolt under the influence of the spring 25. Heretofore bolts of this character have been objectional through failure to compensate for the expansion and contraction incident to heating and cooling of the bearing and for unevenness of wear on the shaft or bearing. Upon cooling and contraction, the slack has been taken up in the manner described, but on subsequent heating and expansion the adjustment was found too tight, causing undue stiffness and increased friction.

I have overcome this objection by the provision of resilient means which will counteract to a slight extent the effect of the spring 25, thus preventing the taking up of all of the slack, the resilient means also being adapted to yield to absorb the pressure occasioned by expansion or by uneven wear of the shaft or bearing. In the device illustrated, such means comprise an undulated spring ring 24 disposed on the bolt between the nut 19 and bearing cap 8 and in contact with both. This ring is adapted to seat in an annular groove 26 provided in the flanged head 20 of the nut 19.

In Fig. 4 a modified form of the invention is shown in which the bolt 40 is provided with a round reduced extension 41 upon which is mounted a castellated cap 42. The cap 42 is locked against movement on the bolt by the cotter key 43 which engages an aperture in the extension 41 and also one of the cap grooves. The nut 44 is provided with a circumferential flange 45 formed slightly inwardly from the head end. Here the resilient member 46 bears against the cap 47, the lower face of the flange 45 and encompasses the neck of the nut which forms the projection 48.

Wherever the word "nut" is used in the following claims without being accompanied by words which state in effect that the nut is in screw-threaded engagement with the bolt, it is to be understood that the word "nut" is intended to include within its meaning any member which is caused to advance axially along a bolt when turned angularly in one direction. Such a member would not necessarily need to be in screw-threaded engagement with the bolt, but might be, for instance, in camming engagement with a portion of the bolt or with another member associated directly or otherwise with the bolt.

I claim:

1. In a device of the class described, the combination with a bolt and nut, of means operable upon the nut to compensate automatically for wear of the parts with which the bolt and nut are associated, and means for permitting temporary limited retraction of the parts.

2. In a device of the class described, the combination with a bolt and nut, of means operable upon the nut to compensate automatically for wear of the parts with which the bolt and nut are associated, and a resiliently yieldable member adapted to react against the compensating means to permit temporary limited retraction of the parts.

3. In a device of the class described, the combination with a bolt and nut, of means operable upon the nut to compensate automatically for wear of the parts with which the bolt and nut are associated, a resiliently yieldable member adapted to react against the compensating means to permit temporary limited retraction of the parts, and means operable to prevent the member from yielding to its full extent.

4. The combination with a wear compensating bolt and a nut mounted thereon, of a torsional spring mounted on the nut and having one end anchored to the nut for automatically advancing the same on the bolt, an adjustable washer mounted on the bolt and engaging the other end of the spring, means provided on the bolt for adjusting and locking the washer against rotation, and means for permitting temporary limited retraction of the parts with which the bolt is associated.

5. In a device of the class described, the combination with two complementary parts for retaining a bearing member, of a bolt adapted to hold the parts together, the bolt having a threaded portion and a reduced extension beyond the threaded portion, a nut having a circumferential flange on one end, a torsional spring mounted on the nut with one end anchored to the flange for automatically advancing the nut on the bolt, a washer engaging the free end of the spring and adapted to be turned and seated on the extension to place and hold the spring under torsion, and resiliently yieldable means interposed between the nut and the parts.

6. In a device of the class described, the combination with a jaw and a cap for retaining a bearing member, of a bolt adapted to hold the jaw and cap together having a threaded portion and a reduced extension beyond the threaded portion, a nut mounted on the threaded portion of the bolt and having a flange at one end thereof, the flange being recessed in its outer face, a washer locked to the extension, a coil spring mounted on the nut and having one end anchored to the flange and the other to the washer for automatically advancing the nut on the bolt, and a resiliently yieldable member adapted to seat in and protrude partially from the recess of the flange of the nut to counteract the force of the spring and thus to permit limited retraction of the jaw and the cap.

7. In a device of the class described, the combination with a bolt and nut, of means operable upon the nut to compensate automatically for wear of the parts with which the bolt and nut are associated, a resiliently yieldable member adapted to react against the compensating means to permit temporary limited retraction of the parts, and means independent of the bolt for holding the member in proper position relative to the bolt.

8. In a device of the class described, the combination with a bolt and nut, of means operable upon the nut to compensate automatically for wear of the parts with which the bolt and nut are associated, a resiliently yieldable member adapted to react against the compensating means to permit temporary limited retraction of the parts, and a seat for the member in the nut for holding the member in concentric relation to the bolt.

9. In a device of the class described, the combination with means tending automatically to clamp together the parts with which the device is associated during contraction of such parts, of other means also tending automatically to clamp together the parts, said first mentioned means being incapable of automatic retrograde movement, and said last mentioned means being resiliently yieldable and interposed between the parts and the first mentioned means, whereby to permit temporary limited retraction of the parts.

10. In a device of the class described, the combination with a bolt and nut, of a coil spring operable angularly upon the nut to advance the same axially along the bolt and thereby compensate automatically for contraction of the parts with which the bolt and nut are associated, and a resiliently yieldable member so arranged as to offer resistance both to advancement of the nut and to separation of the parts, whereby limited retraction of the parts is possible without retrograde movement of the nut.

11. In a device of the class described, a threaded bolt, a nut in screw-threaded engagement with the bolt, a spring connected with the nut for screwing the latter along the bolt to take up any play in the bolt occasioned by contraction of the parts which are adapted to be clamped together by the bolt and nut, and another spring acting between the nut and the part adjacent thereto for permitting slight separation of the parts.

12. In a device for clamping parts together, a bolt, a nut, a coil spring associated with the nut and tending in service to advance the nut helically along the bolt toward the parts, and a substantially flat spring also associated with the nut and tending in service to maintain the part nearest the nut normally in spaced relation to the nut, said last mentioned spring being resiliently compressible to permit the part nearest the nut to back up toward the nut but only under a force in excess of that transmitted thereto by the nut in advancing under the action of the first mentioned spring.

In testimony whereof I have hereunto signed my name.

GUSTAV C. MONCKMEIER.